US011053642B2

(12) United States Patent
Esko et al.

(10) Patent No.: US 11,053,642 B2
(45) Date of Patent: Jul. 6, 2021

(54) COMPOSITION OF PRECIPITATED CALCIUM CARBONATE, METHOD OF PRODUCING THE SAME AND THE USES THEREOF

(71) Applicant: FP-Pigments Oy, Espoo (FI)

(72) Inventors: Aarni Esko, Espoo (FI); Sami Haakana, Espoo (FI); Jarmo Tolonen, Espoo (FI); Jorma Viitanen, Espoo (FI); Eija Pekkala, Espoo (FI)

(73) Assignee: FP-PIGMENTS OY, Espoo (FI)

( * ) Notice: Subject to any disclaimer, the term of this patent is extended or adjusted under 35 U.S.C. 154(b) by 450 days.

(21) Appl. No.: 14/899,616

(22) PCT Filed: Jun. 19, 2014

(86) PCT No.: PCT/FI2014/050495
§ 371 (c)(1),
(2) Date: Dec. 18, 2015

(87) PCT Pub. No.: WO2014/202836
PCT Pub. Date: Dec. 24, 2014

(65) Prior Publication Data
US 2016/0130764 A1 May 12, 2016

(30) Foreign Application Priority Data

Jun. 20, 2013 (FI) .................................... 20135683

(51) Int. Cl.
*B32B 5/16* (2006.01)
*D21H 21/18* (2006.01)
(Continued)

(52) U.S. Cl.
CPC ............. *D21H 21/18* (2013.01); *C01F 11/18* (2013.01); *C08K 3/26* (2013.01); *C09C 1/021* (2013.01);
(Continued)

(58) Field of Classification Search
CPC ........ C04B 14/28; C09C 1/0081; C09C 1/021; C01P 2004/32; C01P 2004/50; C01P 2004/61; C01F 11/18
See application file for complete search history.

(56) References Cited

U.S. PATENT DOCUMENTS 2,981,596 A * 4/1961 McClure ................ B82Y 30/00
423/431
3,992,314 A * 11/1976 Cherney .................. C11D 3/06
510/443
(Continued)

FOREIGN PATENT DOCUMENTS

CN 1293642 A 5/2001
EP 0 944 551 9/1999
(Continued)

OTHER PUBLICATIONS

Toshiharu & Koji, Application of spherical hollow calcium carbonate particles as filler and coating pigment, Toshiharu Enomae, May 2004 (Year: 2004).*
(Continued)

*Primary Examiner* — Hoa (Holly) Le
(74) *Attorney, Agent, or Firm* — McCormick, Paulding & Huber PLLC

(57) ABSTRACT

Composition of precipitated calcium carbonate and method of producing the same and the uses of the composition. The composition comprises a plurality of essentially spherical granules having an average diameter of 1-50 um formed from primary precipitated calcium carbonate particles having an average diameter of 30 to 60 nm, capable of liberating at least a part of the primary particles by deagglomeration in aqueous suspension. The present compositions can be used for modifying binders of paints, printing inks, plastics, adhesives, sealants and surface sizes and pulp sizes. The
(Continued)

invention further concerns a method for storing of precipitated calcium carbonate particles having an average diameter in the nanometer range.

9 Claims, 2 Drawing Sheets

(51) Int. Cl.
| | |
|---|---|
| *D21H 17/67* | (2006.01) |
| *C08K 3/26* | (2006.01) |
| *C09C 1/02* | (2006.01) |
| *D21H 19/38* | (2006.01) |
| *D21H 21/52* | (2006.01) |
| *C09D 11/037* | (2014.01) |
| *C09D 7/40* | (2018.01) |
| *C01F 11/18* | (2006.01) |
| *D21H 19/64* | (2006.01) |

(52) U.S. Cl.
CPC .............. *C09D 7/67* (2018.01); *C09D 11/037* (2013.01); *D21H 17/675* (2013.01); *D21H 19/385* (2013.01); *D21H 19/64* (2013.01); *D21H 21/52* (2013.01); *C01P 2004/32* (2013.01); *C01P 2004/50* (2013.01); *C01P 2004/61* (2013.01); *C01P 2004/64* (2013.01); *C01P 2006/22* (2013.01); *C01P 2006/60* (2013.01); *C01P 2006/62* (2013.01); *C01P 2006/63* (2013.01); *C01P 2006/64* (2013.01); *C08K 2003/265* (2013.01)

(56) References Cited

U.S. PATENT DOCUMENTS

| | | | | |
|---|---|---|---|---|
| 4,035,257 | A | * | 7/1977 | Cherney ................. C11D 3/06 510/531 |
| 6,114,289 | A | * | 9/2000 | Capeci ................ C11D 3/1233 134/42 |
| 6,602,484 | B1 | | 8/2003 | Virtanen |
| 2006/0052503 | A1 | | 3/2006 | Shimizu et al. |
| 2007/0227402 | A1 | | 10/2007 | Hui |
| 2009/0017233 | A1 | | 1/2009 | Kaessberger et al. |
| 2010/0120945 | A1 | | 5/2010 | Sahlberg et al. |
| 2011/0305759 | A1 | * | 12/2011 | Koehler ............... A23D 7/0053 424/479 |
| 2014/0234639 | A1 | * | 8/2014 | Malla ................... B41M 5/5218 428/452 |
| 2015/0096698 | A1 | * | 4/2015 | Gantenbein ............ D21H 17/00 162/168.3 |

FOREIGN PATENT DOCUMENTS

| | | |
|---|---|---|
| EP | 2 565 237 A1 | 8/2011 |
| JP | 314696 A | 1/1991 |
| JP | 0956316 A1 | 11/1999 |
| JP | 2001501905 A | 2/2001 |
| JP | 2002034510 A | 2/2002 |
| JP | 2008537926 A | 10/2008 |
| WO | 97/32934 A1 | 12/1997 |
| WO | 98/16471 A1 | 4/1998 |
| WO | 99/36361 A1 | 7/1999 |
| WO | 2006109171 A1 | 10/2006 |
| WO | 2013/050495 A1 | 4/2013 |

OTHER PUBLICATIONS

Tong et al, "Control over the crystal phase, shape, size and aggregation of calcium carbonate via a L-aspartic acid inducing process," Biomaterials 25 (2004) 3923-3929 (Year: 2004).*
Tappi Method T-205 and T-452 (Year: 2003).*
International Search Report for PCT Serial No. PCT/FI2014/050495 dated Sep. 25, 2014.
Finnish Search Report for Application Serial No. 20135683 dated Apr. 1, 2014.
Japanese Search Report dated Jan. 30, 2018 for corresponding Japanese Application No. 2016-520559.

* cited by examiner

COMPOSITION OF PRECIPITATED CALCIUM CARBONATE, METHOD OF PRODUCING THE SAME AND THE USES THEREOF

CROSS REFERENCE TO RELATED APPLICATIONS

This application is entitled to the benefit of and incorporates by reference subject matter disclosed in International Patent Application No. PCT/FI2014/050495 filed on Jun. 19, 2014 and Finnish Patent Application No. 20135683 filed Jun. 20, 2013.

TECHNICAL FIELD

The invention relates to compositions of precipitated calcium carbonate and to the production and uses thereof.

In particular, the present invention concerns compositions of precipitated calcium carbonate which comprise a plurality of particles having an average particle size in the nanometer range. The present invention also concerns methods of producing a composition comprising a plurality of precipitated calcium carbonate granules composed of particles having an average particles size in the nanometer range.

The present invention further concerns a method for storing of precipitated calcium carbonate particles having an average diameter in the nanometer range by producing a composition comprising a plurality of precipitated calcium carbonate granules having an average diameter of more than 1 micrometer.

The present invention further concerns compositions of precipitated calcium carbonate in aqueous slurry further containing a binder as well as methods of preparing the same.

BACKGROUND ART

Precipitated calcium carbonate particles having an average particles size in the nanometer range are known in the art (cf. EP 0 944 551 and EP 0 956 316). For example EP Patent No. 0 944 551 discloses precipitated calcium carbonate particles, which are present in the form of polynuclear spherical agglomerates containing a number of spherical calcium carbonate aggregates which are attached to each other and have a particle size of approximately 40 to 200 nm.

WO 2013/050495 describes nanofibers or nanochain like agglomerates constituted typically of 2-20 interconnected primary particles of precipitated calcium carbonate. The size of the primary particles is typically 30-60 nm. The diameter of the nanofibers or nanochain like agglomerates is approximately the same as that of the primary particles. The length is typically 20-2000 nm, in particular 60-480 nm. The nanofibers or nanochain like agglomerates can form larger aggregates (microshells). The median size of the aggregates can be up to 5 micrometer. The aggregates of the size 0.1 to 1.5, in particular 0.6 to 1.5 micrometer are useful as such as opacifiers. In the preparation of PCC, the carbonation is carried out in the presence of a crystallization controller, namely polyacrylic acid. The product was constituted of nanochain like agglomerates, combined to form microshell like aggregates with a medium size of 0.85 micrometer. However, when the aggregates were subjected to shear forces in a pin mill, they did not break down into essentially spherical primary particles. Instead microshell like aggregates of 0.6 to 1.5 micrometer were obtained.

US 2009/0017233 concerns stable, porous agglomerates of PCC, useful in coatings. The mean diameter of the agglomerates is 1 to 5 micrometer and they are based on primary PCC particles with a diameter of 20 to 50 nanometer. The agglomerates are not created by drying a slurry of nanosized PCC particles. The desired PCC agglomerates are obtained directly in the precipitation process by leading carbon dioxide gas at low speed through a calcium hydroxide slurry in the presence of Mg-, Al- or Zn-sulfates or sulfuric acid. The agglomerates obtained were very stable.

PCC particles can be used for coating of fibrous products and as fillers for paper, polymers, paint and rubber.

Stiffness (bending stiffness, rigidity) is one of the most critical and desired paper and paperboard property. Lack of stiffness will cause several kinds of difficulties during processing for example when paper is printed, when it is converted e.g. to envelope, and when it is run through a high speed copier. On the other hand, high paper stiffness enables paper maker to make some very high value changes in his paper making process. He can for example increase filler load (high ash will cause loss in stiffness) or he can reduce the basis weight of the paper/board, which will have huge impact on the overall raw material use.

Conventionally, stiffness is achieved by selecting raw materials in such a way that they will generate a bulky fiber network. More bulky paper is stiffer also. Filler pigments are selected to boost caliper, fiber refining/beating is done as low as possible to maintain bulky fiber body. The compromise is in tensile strength, which is often lower when more bulky structures are created.

Surface sizing with starch is a commonly used process step for improving the paper surface for printing. Surface sizing also improves paper stiffness. When starch is dried after application on the paper surface, it creates a stiff but brittle film. Higher the solids of the used surface starch, better stiffness it will generate. Limitation in solids increase will be in dusting; when solids content of surface starch is too high, it will create starch flakes to dust.

There have been many successful but also failed attempts to use some mineral pigment with surface starch to improve paper optics, improve printability, and reduce overall costs through fiber replacement: additional weight through applied pigment is calculated off from the use of fiber. Typical failure is in reduced paper stiffness and pigment dusting. When successful, the level of mineral pigment has been low, typically some 20-30% calculated from the level of starch. The applied total amount has been 1-2 g/m$^2$/side, i.e. pigment addition could totally be on the order of 1.0 g/m$^2$. A drawback of the use of pigments in conjunction with surface sizes is that stiffness has been impaired, typically a decrease of about −10% has been noted.

SUMMARY OF INVENTION

It is an aim of the present invention to eliminate at least a part of the problems related to the art and to provide novel compositions of precipitated calcium carbonate.

In particular, it is an aim of the invention to provide novel compositions of precipitated calcium carbonate which are capable of application on substrates to achieve new or improved properties thereon.

It is another aim of the invention to provide methods of producing such compositions.

It is still a further aim of the invention to provide for the use of the compositions for treatment of various substrates and other surfaces.

The present invention is based on the idea of providing particles of precipitated calcium carbonate having an average particle size in the range of about 30 to 60 nm.

Surprisingly it has been found that particles of the indicated size can be granulated by agglomeration to form granules which are at least roughly of spherical shape and which exhibit an average diameter in the range of about 1 to 50 um, in particular about 1 to 25 um, as shown in the attached figure. Such granules can be deagglomerated to yield the constituent primary particles.

In a preferred embodiment, the granulation is carried out by providing an aqueous slurry of particles of precipitated calcium carbonate having an average diameter of 30 to 60 nm, said slurry being essentially free from binders, drying said slurry, preferably in a spray dryer, and recovering the granules in dry state.

It has further been found that particles of precipitated calcium carbonate having an average particle size in the range of 30 to 60 nm can be used for surface treatment or coating of substrates together with various binders in an aqueous slurry, to provide novel properties. The particles can be used as such without an intermediate granulation step but they can also be granulated—optionally isolated and dried in granulated form—and then deagglomerated to release the desired particles having the indicated particle size of 30 to 60 nm.

More specifically, the present compositions of precipitated calcium carbonate granules comprise a plurality of essentially spherical granules having an average diameter of 1-50 um formed from primary precipitated calcium carbonate particles having an average diameter of 30 to 60 nm, capable of liberating at least a part of the primary particles by deagglomeration in aqueous suspension.

The method of producing precipitated calcium carbonate granules comprises a plurality of precipitated calcium carbonate granules having an average diameter of 1-50 um, in particular 2 to 40 um, said method comprising the steps of providing an aqueous slurry of particles of precipitated calcium carbonate having an average diameter of 30 to 60 nm, said slurry being essentially free from binders, drying said slurry preferably in a spray dryer using a spraying nozzle or an atomizer disc, and recovering the granules in dry state.

The composition of precipitated calcium carbonate in aqueous slurry further containing a binder wherein said composition contains 1 to 35%, advantageously about 5 to 20%, calculated from the weight of the binder, of precipitated calcium carbonate particles having an average diameter of 30 to 60 nm and the method of producing it comprising the steps of providing a composition of dry granules of precipitated calcium carbonate having an average diameter of 1 to 50 um, about 2 to 40 um, in particular about 2.5 to 30 um, preferably about 4 to 15 um; mixing the granules into a water phase to provide an aqueous slurry comprising a binder; and subjecting the granules to shear forces so as to deagglomerate the granules to yield particles of precipitated calcium carbonate particles, having an average diameter of 30 to 60 nm.

The novel uses are characterized by coating of fibrous webs and products, wherein the composition is formulated into a coating colour, wherein the composition is used for producing fibrous webs having ability to improve paper stiffness, and wherein modifying binders of paints, plastics, adhesives, sealants, printing inks sand surface and pulp sizes.

The novel method for storing of precipitated calcium carbonate particles having an average diameter in the nanometer comprises producing a composition comprising a plurality of precipitated calcium carbonate granules having an average diameter of 1-50 um, in particular 2 to 40 um, said method comprising the steps of providing an aqueous slurry of particles of precipitated calcium carbonate having an average diameter of 30 to 60 nm, said slurry being essentially free from binders, drying said slurry preferably in a spray dryer using a spraying nozzle or an atomizer disc, and recovering the granules in dry state, wherein said composition is capable of liberating at least a part of the primary particles by deagglomeration in aqueous suspension.

Considerable advantages are obtained by the invention. As the results discussed below indicate, the present particles are capable of considerably improving stiffness of paper or cardboard when applied on the surface together with a conventional surface size, such as starch.

The nano-sized particles can be used as such in aqueous slurry. Alternatively, by granulating the nano-sized particles they can be recovered and dried from the aqueous slurry in which they are formed. The granules are easily stored and transported. By slurrying the granules in water and by subjecting them to conditions of moderate to high shear forces the agglomerates can be broken up in discrete primary particles.

Next preferred embodiments are examined in more detail.

DETAILED DESCRIPTION

Figure 1:
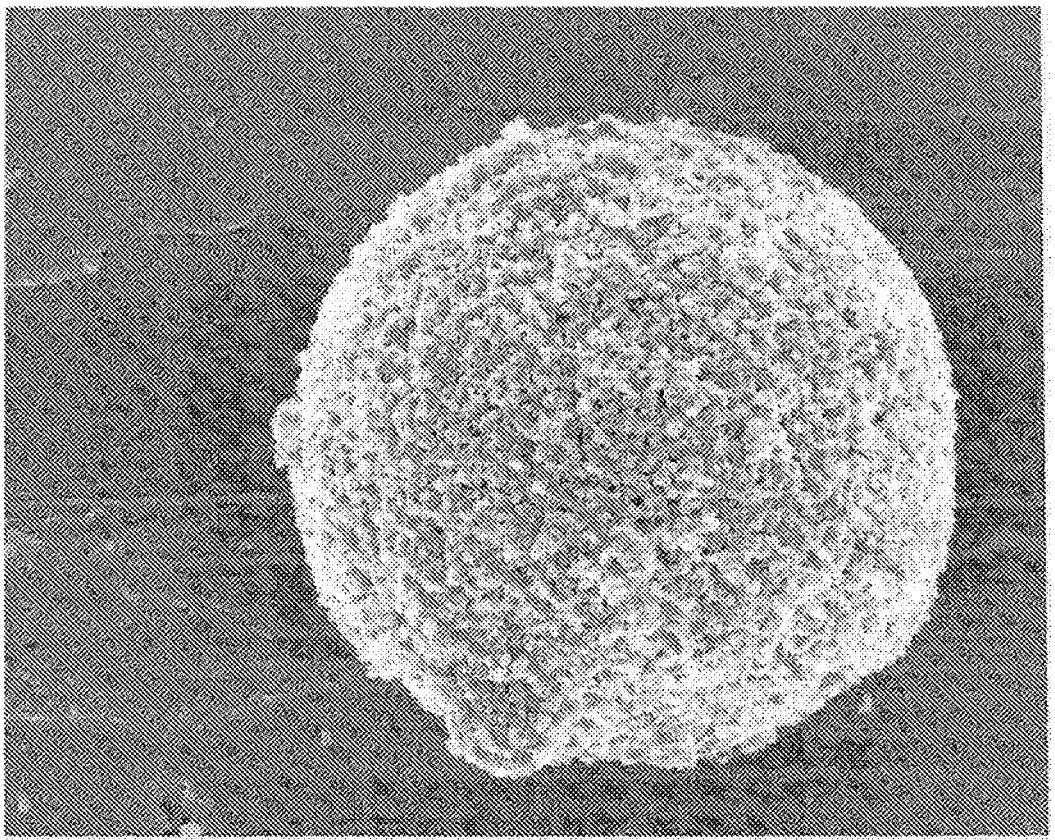
FIG. 1 is a scanning micrograph of a granule according to one embodiment.

In the present context, the abbreviation "PCC" is used to designate precipitated calcium carbonate.

Further, the abbreviation "nPCC" is used to designate particles of precipitated calcium carbonate having an average particle size in the nanometer range, in particular the average particle size of the "nPCC" particles are, in the present context, about 30 to 60 nm.

As was discussed above, the present technology comprises in a first embodiment compositions of precipitated calcium carbonate, which are formed by a plurality of essentially spherical granules having an average diameter of 1-50 um formed from primary PCC particles having an average diameter of 30 to 60 nm. In a preferred embodiment the granules have an average size (diameter) of about 2 to 40 um, in particular about 2.5 to 30 um, preferably about 4 to 15 um, such as 5 to 10 um.

By "essentially spherical" is meant that the ovality (deviation from spherical shape) is 20% or less.

The compositions according to the first embodiment can be composed of (i.e. consist) of the granules only. It is also possible to provide compositions wherein the present granules make up 50% of the weight of the composition, the remainder being formed by other particles, such as other kinds particles of precipitated calcium carbonate or other pigments, such as silicates, bariums sulphate, Kaolin clay, Bentonite, Magnesium carbonate, dolomite, talc, mica, aluminium silicates, silica, aluminium hydroxide, titanium dioxide and organic polymers, or combinations thereof.

It is also possible to provide compositions of PCC particles having the indicated average diameter of 30 to 60 nm, only a part of which are present as granules. Typically, in the first embodiment of the invention, discussed in the present context, at least 20% by total weight of the particles is formed into granules.

The primary particles are characterized as having a "diameter" of 30 to 60 nm. This is not to be taken as a positive indication that all of the particles are spherical although it is believed that at least a considerable part of them roughly meets the above given definition for spherical particles. Broadly, the term "diameter" designates that the particles have an average size in the indicated range. Typically, the smallest diameter is 20 nm.

The primary particles can be produced for example by a method typically comprising the steps of continuously feeding calcium hydroxide as fine drops and/or particles into gas which contains carbon dioxide and which is inside a precipitation reactor, in order to carbonate the calcium hydroxide, i.e. in order to produce precipitated calcium carbonate in the precipitation reactor.

Calcium hydroxide or other suitable $Ca^{++}$ ion sources can be used as a reactive mineral substance, from which calcium carbonate is formed using carbon dioxide. Typically, calcium hydroxide is fed into the precipitation reactor as a calcium hydroxide sludge, i.e. as calcium hydroxide dispersed in water, such as lime milk, but it can also be fed in as a calcium hydroxide solution. The material is advantageously fed into the reactor through a disintegration and spraying apparatus located in the reactor or in association with it.

In the method, a disintegration and spraying apparatus of the so-called impact mixer type can be employed. In that kind of mixer, very fine drops and/or particles are formed from the calcium hydroxide sludge or solution.

In addition to the calcium hydroxide sludge, a gas containing carbon dioxide which effects precipitation and which may be pure or nearly pure carbon dioxide, or combustion gas, or other suitable gas containing $CO_2$, is continuously fed into the precipitation reactor.

In order to produce the small particles desired it is advantageous to arrange for precipitation to take place in a lowered reaction temperature, below 65° C., typically at 10-65° C., more typically at 30-65° C., most typically at a temperature below 40° C.

Although the granules can be supplied in the form of an aqueous slurry, one particularly preferred embodiment comprises a composition which is formed by an essentially dry powder of granules of precipitated calcium carbonate. To that purpose, the drying is carried out such that the primary particles, the nano-sized PPC particles, agglomerate to form the granules upon drying.

Spray drying will produce in a repeatable fashion spherical granules formed from a great plurality of primary particles.

Typically, the granules are binder-free.

The granules are capable of liberating the primary particles when subjected to shear forces in aqueous suspension.

Thus, in a preferred embodiment, the particles of precipitated calcium carbonate are liberated from granules, in particular binder-free granules, of precipitated calcium carbonate—said granules having a size of about 2 to 40 um, in particular about 2.5 to 30 um, preferably about 4 to 15 um, by subjecting the granules to shear forces in an aqueous suspension formed by water and said binder. In one embodiment, the granules are subjected to a shear rate in the range of 1 to 10000 $s^{-1}$, typically between 10 and 1000 $s^{-1}$. The present technology also provides for the production of the novel particles.

"Binder-free" or "free from binders" shall be interpreted so that no binder or other additive that could affect the ability of the primary PCC particles to connect to each other is added.

Thus, in a particular embodiment, a composition comprising a plurality of precipitated calcium carbonate granules having an average diameter of 1-50 um, in particular 2 to 40 um, are produced by a method comprising the steps of
  providing an aqueous slurry of particles of precipitated calcium carbonate having an average diameter of 30 to 60 nm, said slurry being essentially free from binders,
  drying said slurry preferably in a spray dryer using a spraying nozzle or an atomizer disc, and
  recovering the granules in dry state.

It is particularly preferred to subject to spray drying an aqueous slurry having a solids content of 10 to 50%, in particular 20 to 40%, for example about 30±5%. Operating at high solids content is advantageous from capacity point of view.

Another embodiment comprises a composition of precipitated calcium carbonate in aqueous slurry further containing a binder. The composition contains normally 1 to 35%, advantageously about 5 to 20%, calculated from the weight of the binder, of precipitated calcium carbonate particles having an average diameter of 30 to 60 nm.

In this context, it should be noted that the compositions according to the second alternative may contain other particles and pigments just as disclosed for the first embodiment above.

The binder of the composition is preferably selected from the group of natural and modified polysaccharides, such as starch and modified starch, and synthetic latexes. Naturally, there may be other binders present as well, but generally the natural or modified polysaccharides, such as starch or derivatives thereof, preferably make up at least 20%, in particular at least 30%, advantageously at least 50% of the binders present, said percentage being calculated from the solids content of the binder.

The aqueous slurry disclosed before can be produced by a method typically comprising the steps of
  providing a composition of dry granules of precipitated calcium carbonate having an average diameter of 1 to 50 um, about 2 to 40 um, in particular about 2.5 to 30 um, preferably about 4 to 15 um;
  mixing the granules into a water phase to provide an aqueous slurry; and
  subjecting the granules to shear forces so as to deagglomerate the granules to yield particles of precipitated calcium carbonate particles, having an average diameter of 30 to 60 nm.

The dry granules are typically binder-free, but in order to produce an aqueous slurry suitable for surface treatment it is preferred to mix into the water phase a binder. In particular, so much binder is added that the aqueous slurry exhibits, based on the weight of the binders, a pigment content of 1 to 35%, advantageously about 5 to 20%.

Just as discussed above, for the granules of the first embodiment, to break up the granules, shear forces are applied on the granules when they are slurried in an aqueous medium. In one preferred embodiment, the granules are subjected to shear rates in the range 1 to 10000 $s^{-1}$, typically between 10 and 1000 $s^{-1}$. As a result, the primary particles are released into the aqueous medium.

The composition described above—i.e. the aqueous slurry with pigments and binder—can be used for example in a process of coating of fibrous webs and products. One possible mode of application is as a coating colour. Thus the composition can be formulated into the coating colour by adding brighteners and conventional auxiliary agents, if so desired, which regulate viscosity and pH of the coating colour. Other pigments can be added also, optionally along with further binders.

A particularly interesting application of an aqueous slurry of the indicated kind is for treating fibrous webs which can be used for producing paper and cardboard products with improved stiffness.

EXAMPLES

Example 1

Surface Starch

The table below shows the surface starch behavior when structured PCC particle is introduced with cooked surface starch with 'gentle' or 'high energy efficient' mixing.

The following components were used: HiCat which is a cationic starch derivative supplied by Roquette Corporation, Blankophor a whitener supplied by Blankophor GmbH & Co. KG, EX-135 an Engineered Nano Granulate supplied by FP-Pigments Oy and produced as expained above using the impact mixer technology. The particles have an average particles size of 30 to 60 nm. Dispermat was used as a stirring device.

TABLE 1

Trial 1. Mixing study.

|  | Control | Trial 1 | Trial 2 | Trial 3 | Trial 4 |
|---|---|---|---|---|---|
| HiCat SP0052 | 100 | 100 | 100 | 100 | 100 |
| Blankophor P 01 | 0.5 | 0.5 | 0.5 | 0.5 | 0.5 |
| EX-135, gentle mixing |  | 10 |  | 30 |  |
| EX-135, efficient mixing |  |  | 10 |  | 30 |
| Viscosity 100 rpm, cP | 150 | 90 | 154 | 384 | 5580 |
| Viscosity 50 rpm, cP | 160 | 80 | 160 | 362 | 8380 |
| Solids, % | 15.8 | 16 | 15.1 | 15.1 | 15.4 |
| Temperature, ° C. | 66 | 64 | 64 | 64 | 64 |

As apparent, the viscosity increase (Trial 3 vs. Trial 4) is a clear indication of the phenomena, the structured PCC particles de-agglomerates and number of ultrafine pigment particles is substantially increased.

Example 2

Paper Stiffness

Table 2 below shows the paper stiffness when even low level of structured PCC is used correctly with surface starch. The de-agglomeration of structured PCC material was ensured with 'efficient mixing', viscosity increase and the impact on paper stiffness is +10%.

TABLE 2

Trial 2. Coating study.

|  | Control | Trial 1 | Trial 2 |
|---|---|---|---|
| HiCat SP0052 | 100 | 100 | 100 |
| Blankophor P 01 | 0.5 | 0.5 | 0.5 |
| EX-135, gentle mixing |  | 10 |  |
| EX-135, efficient mixing |  |  | 10 |
| Bending stiffness, mNm | 105.2 | 103.2 | 114.6 |
| Brightness, % (R457 D65) | 89.68 | 89.93 | 88.6 |
| Fluoresence (R457 Fluor D65) | 7.17 | 7.5 | 6.19 |
| Opacity, % (D65) | 86.95 | 86.74 | 87.45 |
| Scattering coefficient, $m^2/g$ | 32.41 | 32.76 | 32.97 |
| Absorption coefficient, $m^2/g$ | 0.74 | 0.74 | 0.75 |
| Grammage, g/m2 | 87 | 85.4 | 87.8 |
| Coat weight, g/m2 | 7.1 | 7.4 | 7.5 |

Example 3

Another study was conducted to compare blocky GCC and blocky PCC against nPCC. In the table below, the GCC is commonly used ground calcium carbonate with particle size 60% below 2.0 microns. PCC1 is nPCC and PCC2 is blocky pigment with average particle size 1.0 microns.

TABLE 3

|  | Binder (100 pph) | | | |
|---|---|---|---|---|
|  | Starch | Starch | Starch | Starch |
|  |  | Pigment (30 pph) | | |
|  | — | GCC | PCC1 | PCC2 |
| Basis weight, $g/m^2$ | 62.5 | 62.2 | 62.2 | 62.7 |
| Total coatweight, $g/m^2$ | 3 | 3 | 3 | 3 |
| Coatweight/side, $g/m^2$ | 1.45 | 1.45 | 1.45 | 1.45 |
| Bending resistance MD | 44.6 | 42.1 | 48.7 | 44.7 |
| Bending resistance CD | 23.5 | 23.7 | 27.6 | 20.7 |
| Stiffness change, % |  | −3.4 | 12.0 | −4.0 |
| Optics (D65): |  |  |  |  |
| L* | 92.56 | 92.52 | 92.57 | 92.53 |
| a* | 0.76 | 0.67 | 0.69 | 0.68 |
| b* | −4.52 | −4.22 | −4.15 | −4.14 |
| CIE Whiteness, % | 102.86 | 101.4 | 101.19 | 101.03 |
| Fluoresence | 12.96 | 11.54 | 11.45 | 11.35 |
| Brightness, % | 88.3 | 87.7 | 87.7 | 87.6 |
| Opacity, % | 81.7 | 82.9 | 83.5 | 83.8 |
| Scattering coefficient, $m^2/g$ | 35.8 | 37.8 | 39.0 | 39.2 |
| Absorption coefficient, $m^2/g$ | 0.77 | 0.81 | 0.82 | 0.84 |

Table 3 shows the common issue when pigment is used with surface starch, paper stiffness is often lowered. This happens with both blocky pigments.

nPCC improves paper stiffness by 12% and shows clear potential in terms of paper stiffness enhancer.

Example 4

Deagglomeration of PCC Granules into PCC Primary Particles

Figure 2:
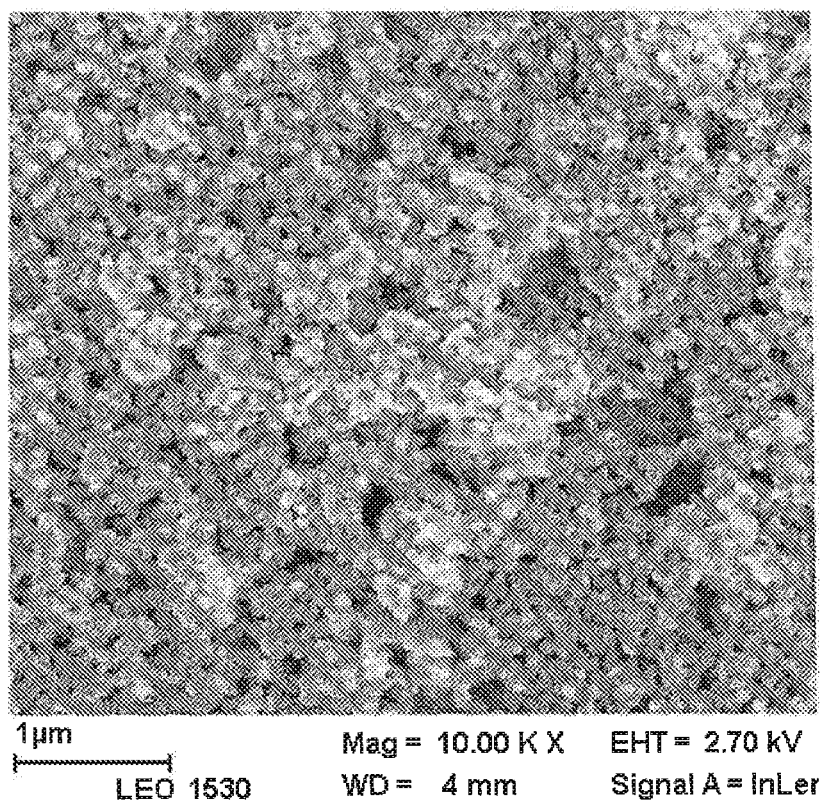
FIG. 2 is a scanning electron microscope image showing nano-sized primary particles of PCC obtained by deagglomerating of PCC granules in a pin mill.

The PCC granules shown in FIG. 1, exhibiting an average diameter in the range of about 1 to 50 um, were subjected to shear forces in an Alpine Z100 pin mill. FIG. 2 shows that the granules were deagglomerated to yield the constituent primary particles in the nanometer range.

The present compositions can be used for modifying binders of paints, printing inks, plastics, adhesives, sealants and surface sizes and pulp sizes.

The compositions can be formulated into coating colours for fibrous products, such as paper and cardboard products, webs and sheets.

In particular, the composition can be used for producing fibrous webs having ability to improve paper stiffness. For this purpose, the compositions can be used for example as surface sizes.

It should be pointed out that the present technology provides for the use of compositions of nanosized PCC (as defined above) for the purpose of modifying paints, printing inks, plastics, adhesives, sealants, and surface and pulp sizes irrespective of whether the nanosized PCCs are obtained directly from carbonation or from deagglomeration of granules.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A composition of precipitated calcium carbonate, consisting of a plurality of essentially spherical granules having an average diameter of 1-50 um formed from only primary precipitated calcium carbonate particles having an average diameter of 30 to 60 nm, the granules being capable of liberating the primary particles by deagglomeration in aqueous suspension.

2. The composition according to claim 1, wherein the granules have an average size of about 2 to 40 um.

3. The composition according to claim 1, wherein the granules are capable of liberating the primary particles when subjected to shear forces in aqueous suspension.

4. The composition according to claim 1, wherein the composition comprises an essentially dry powder of granules of precipitated calcium carbonate.

5. The composition according to claim 1, obtained by spray drying of an aqueous slurry of primary particles of precipitated calcium carbonate, said slurry having a solids content of 10 to 50%, and recovering the granules thus obtained.

6. The composition according to claim 5, wherein spray drying is carried out by conducting the aqueous slurry through a spraying nozzle or an atomizer disc in a spray dryer.

7. The composition according to claim 1, wherein the granules are binder-free.

8. A method of producing a composition consisting of a plurality of precipitated calcium carbonate granules having an average diameter of 1-50 um formed from only primary precipitated calcium carbonate particles, said method comprising the steps of providing an aqueous slurry of particles of precipitated calcium carbonate having an average diameter of 30 to 60 nm, said slurry being essentially free from binders, drying said slurry preferably in a spray dryer using a spraying nozzle or an atomizer disc, and recovering the granules in dry state.

9. The method according to claim 8, comprising spray drying an aqueous slurry having a solids content of 10 to 50%.

* * * * *